(12) United States Patent
Roberts et al.

(10) Patent No.: US 11,781,938 B2
(45) Date of Patent: Oct. 10, 2023

(54) METHOD OF INSPECTING PIPE JOINTS FOR USE IN A SUBSEA PIPELINE

(71) Applicant: VERDERG PIPE TECHNOLOGY LTD., Surrey (GB)

(72) Inventors: Peter Roberts, Surrey (GB); Alastair Walker, Surrey (GB)

(73) Assignee: Verdergpipe Technology LTD, Surrey (GB)

( * ) Notice: Subject to any disclaimer, the term of this patent is extended or adjusted under 35 U.S.C. 154(b) by 167 days.

(21) Appl. No.: 17/416,864

(22) PCT Filed: Dec. 19, 2019

(86) PCT No.: PCT/GB2019/053630
§ 371 (c)(1),
(2) Date: Jun. 21, 2021

(87) PCT Pub. No.: WO2020/128489
PCT Pub. Date: Jun. 25, 2020

(65) Prior Publication Data
US 2022/0057288 A1      Feb. 24, 2022

(30) Foreign Application Priority Data
Dec. 19, 2018   (GB) ..................................... 1820755

(51) Int. Cl.
*G01M 3/28* (2006.01)
(52) U.S. Cl.
CPC ................................. *G01M 3/2861* (2013.01)
(58) Field of Classification Search
CPC ............ G01N 3/12; G01N 2203/0274; G01M 3/2861
See application file for complete search history.

(56) References Cited

U.S. PATENT DOCUMENTS

| | | | |
|---|---|---|---|
| 4,192,194 A | 3/1980 | Holt | |
| 4,524,524 A * | 6/1985 | Frank | G01B 5/08 33/199 R |

(Continued)

FOREIGN PATENT DOCUMENTS

| | | |
|---|---|---|
| CN | 201600300 U | 10/2010 |
| CN | 208140480 U | 11/2018 |

(Continued)

OTHER PUBLICATIONS

Search report for Patent Application No. GB1820755.5, dated Jun. 20, 2019, 2 Pages.

(Continued)

*Primary Examiner* — Natalie Huls
(74) *Attorney, Agent, or Firm* — Gearhart Law, LLC; David Postolski

(57) ABSTRACT

A method of inspecting a pipe joint for use in a subsea pipeline and a method of manufacturing a pipe joint for use in a subsea pipeline employing said inspection method are disclosed, the inspection method comprising the steps of: receiving a pipe joint; measuring the ovality of the pipe joint to obtain ovality data; determining that the ovality data does not exceed a predetermined maximum pipe joint ovality value; and carrying out external pressure collapse tests on a ring cut from one end of the received pipe joint, resulting in data representative of the hydrostatic collapse pressure of said pipe joint for use in confirming that the pipe joint is suitable for its intended use.

22 Claims, 4 Drawing Sheets

(56) References Cited

U.S. PATENT DOCUMENTS

| | | | | |
|---|---|---|---|---|
| 5,050,310 A * | 9/1991 | Jiles | ........................ | B23B 5/167 D10/64 |
| 5,867,275 A * | 2/1999 | Curtis, Jr. | ............ | G01B 11/105 356/635 |
| 6,272,762 B1 * | 8/2001 | Kinast | .................... | G01B 5/213 33/550 |
| 2003/0189713 A1 * | 10/2003 | Lam | ........................ | G01B 11/08 33/555.1 |
| 2004/0016139 A1 * | 1/2004 | Lam | .................... | G01B 11/105 33/544 |
| 2006/0212261 A1 * | 9/2006 | Glascock | ............... | G01B 17/00 702/155 |
| 2010/0212405 A1 * | 8/2010 | Roberts | .................... | G01N 3/12 73/49.6 |
| 2011/0146407 A1 * | 6/2011 | Huebler | ............... | G01N 29/265 73/588 |
| 2015/0146216 A1 * | 5/2015 | Krauhausen | ........... | G01B 11/24 356/612 |
| 2018/0135974 A1 * | 5/2018 | Stigall | .................. | G01B 11/245 |
| 2018/0156688 A1 * | 6/2018 | Murray | ............... | G01M 5/0025 |
| 2019/0120034 A1 * | 4/2019 | Long, III | ................ | E21B 17/00 |
| 2020/0018593 A1 * | 1/2020 | Zhang | .................. | G01B 17/025 |
| 2020/0034403 A1 * | 1/2020 | Nagata | .................... | G06F 30/23 |
| 2020/0132225 A1 * | 4/2020 | Roberts | .................... | F16L 1/26 |
| 2020/0132576 A1 * | 4/2020 | Roberts | .................... | G01N 3/12 |

FOREIGN PATENT DOCUMENTS

| | | |
|---|---|---|
| FR | 2505498 A1 | 11/1982 |
| GB | 2565528 A | 2/2019 |
| JP | H08285749 A | 11/1996 |
| KR | 20120084804 A * | 7/2012 |

OTHER PUBLICATIONS

International Search report for PCT Application No. PCT/GB2019053630, dated Mar. 30, 2020, 3 Pages.

* cited by examiner

METHOD OF INSPECTING PIPE JOINTS FOR USE IN A SUBSEA PIPELINE

CROSS REFERENCE TO RELATED APPLICATION

This application is a national stage application of PCT-application number PCT/GB2019/053630 filed on Dec. 19, 2019, which claims priority of Great Britain patent application No. 1820755.5 filed on Dec. 19, 2018, both disclosures are incorporated herein by reference.

This invention relates to a method of inspecting a pipe joint for use in a subsea pipeline, and a method for manufacturing a pipe joint for use in a subsea pipeline employing the method of inspection. One aspect of the invention relates to a method for inspecting ovality in a pipe joint and using the findings of the inspection to minimise wall thickness and/or improve maximum hydrostatic pressure rating for the pipe joint.

BACKGROUND

In the oil and gas industry there has been a steady development over the past 25 years in the design of subsea pipelines suitable for installation and operation in ultra-deep water, typically water deeper than 2,000 m, to access deep-water reservoirs of oil and/or gas or transport it across deep bodies of water. Currently, small diameter pipes of about 16 in (about 41 cm) in diameter have been installed up to a depth of around 3,000 m. Larger diameter pipes of up to 32 in (about 81 cm) in diameter have been installed in water depths of up to 2,500 m. It is likely that future projects will require the installations and operation of pipes in depths up to 3,500 m-4,000 m, in which range lies much of the ocean floor globally.

Such pipelines are typically installed filled with air at atmospheric pressure and subsequently filled with oil or gas under pressure once the installation has been completed. A major risk during the installation of this type of pipeline is from the hydrostatic pressure applied by the water, which can cause the pipeline to deform from its virtually initial round shape to an almost flat shape. This is called external pressure collapse, and if not controlled can result in the total loss of the pipeline. When determining the potential for external pressure collapse, the main dimensions of the pipeline are the internal diameter and the wall thickness. These dimensions are also the main drivers in determining whether or not a pipeline is economically feasible: the internal diameter controls the rate at which oil or gas can be transported through the pipeline, and so affects the operational cost over the lifetime of the pipeline; and, the wall thickness is strongly linked to the cost of manufacturing and installing the pipeline. That is, the cost of manufacturing and installing the pipeline increases as the wall thickness increases.

The sensitivity of external collapse pressure of subsea pipelines (e.g. heavy-wall pipelines) to a wide range of material and geometric imperfections as well as workmanship standards is well documented.

Typically, before designs for pipelines are completed, sample pipe joints are formed in small batches and taken to a laboratory and pressurized in a huge tank until they implode. Such testing is known as destructive testing. Destructive testing gives some insight into the real-life strength of similar pipes when they are manufactured much later in the project and laid welded together on the sea floor. Destructive tests have been useful, when combined with generous safety factors, to estimate real-life collapse performance and help validate empirical formulas in industrial subsea pipeline design guidance which link several factors to a projected collapse depth for other pipes with differing properties, dimensions and design pressures.

There are many factors in the design of pipelines suitable for mid-, deep-, and ultra-deep subsea applications, all of which are stipulated in the design guidance. An example of such design guidance is the DNV GL-OS-F101 design code (hereafter referred to as the "DNVGL design code" or "DNVGL method"). Considerations include pipeline ovality, material compressive strength, wall thickness variation, average diameter, material anisotropy ("variability") both around the circumference of the pipeline and through the wall thickness, distortion and material property changes at the longitudinal seam welds present in all deep water pipes, the shape of the stress-strain curve (usually defined in terms of the "tangent modulus"), and the heat treatment and expansion applied to the pipe post-manufacture. The design guidance provides empirical formulas which consider most (if not all) factors by a mixture of empirical coefficients and conservative safety factors. There are many factors to consider, some of which are interrelated. It is a challenge to know how changing one variable will impact other properties of the pipe joint, and there is a reluctance to veer away from the tried and tested design guidance.

It is expensive and cumbersome to destructively test sufficient sample pipes to establish true statistical significance such that an accurate statistical projection can be made through the design guidance of minimum collapse pressure or depth of an inventory of pipe joints intended for installation on the sea floor. There are only a few suitable destructive pipeline testing facilities in the world, and this adds to the impractical nature of destructive testing of pipe joints.

Because there has been no available non-destructive test of the strength of actual pipes to be installed in a pipeline and because there is still limited operational experience with deepwater pipeline installations (e.g. installations of heavy-wall submarine pipelines), the validation gained from destructive testing of only a small, not statistically significant, sample of pipe joints necessitates that a high safety factor/class be used to maintain confidence in the integrity of the whole pipeline. This is normal good engineering practice with prototype or early stage projects of any kind.

Other industries such as the Drilling and Process industries use older empirical rules that simply rely on massively conservative wall thicknesses and/or years of experience to provide an acceptable assurance of safety.

The main aspect when determining the extent of safety class is the consequence of pipeline failure, typically to people, environment and cost. It is common in pipeline collapse pressure design practice to use the safety factor corresponding to medium or high safety classes, however, this often leads to over conservative pipe thickness which in turn leads to heavy and expensive pipes.

One development in pipeline design has been made in understanding the effect of heat treatment applied to the pipe post-manufacture, specifically in understanding the effect of Light Heat Treatment (LHT) on the collapse strength of pipe manufactured by UOE/JCOE methods. The practical development of LHT increases the collapse pressure and therefore for a specified maximum hydrostatic pressure, it is possible to reduce the pipe wall thickness, and consequently, the cost of the pipe whilst maintaining the same levels of safety according to current design guidance. The reduction in wall thickness provided by LHT is only limited, however, and industry is still looking for other ways to provide reduced wall thicknesses.

Accordingly, there is a need to address the problems surrounding over conservative wall thicknesses in subsea pipeline design and/or the problems surrounding safety factor selection in subsea pipeline design. It is the aim of the present invention to alleviate one or both of the aforementioned problems.

The term "pipe" used herein refers to a flow section for a fluid with a substantially circular cross section. The term "cross section" used herein with reference to a pipe refers to a plane substantially perpendicular to the longitudinal axis of a pipe i.e. a substantially transverse plane of the pipe. The term "pipe joint" is used herein to describe a single pipe element having two substantially circular ends, which may be joined to others of a similar type to form a pipeline. The term "heavy-wall" as described herein with respect to pipe joints (which also may be referred to as deep-water pipe to the same effect) refers to a pipe whose failure mode is collapse of the cross-section under uniform external pressure rather than the more common pipe failure mode of tensile failure under internal pressure. This collapse failure may be plastic, elasto-plastic or elastic buckling of the cross-section depending primarily on the ratio of the pipe diameter to its wall thickness. In other words, heavy-wall pipe defined herein are those where the ultimate failure mode of the critical design condition is implosion under external hydrostatic pressure rather than explosion under internal pressure, with no limiting inference regarding the water depth, pipe wall thickness, material properties or ratio of the pipe diameter to its wall thickness. "Ovality" as used herein is the difference between the maximum measured pipe diameter and the measured pipe diameter at right angles to it, divided by the nominal diameter and can be expressed as a percentage, i.e. a pipe joint with a degree of ovality may have an elliptic cross section. "Ovality" is a parameter that has been used historically in codes of practice and design guidelines to characterize the circularity of pipe. The term "out-of-roundness" used herein is the difference between a measured radius at any given point on the circumference and the pipe joint's nominal radius. I.e. "Out-of-roundness" is the deviation of a pipe's perimeter from a circle and can be expressed as a mathematical or graphical function "Topographical Mapping" as used herein is a survey of the inside or outside surface of a pipe expressed as the radius of each surveyed point from the pipe axis. Topographical Mapping as disclosed herein provides out-of-roundness data from which the ovality at any point along the axis can be calculated, if required.

STATEMENTS OF INVENTION

In a first aspect of the invention there is provided a method of inspecting a pipe joint for use in a subsea pipeline, the method comprising the steps of:
  receiving a pipe joint;
  measuring the ovality of the pipe joint to obtain ovality data;
  determining that the ovality data does not exceed a predetermined maximum pipe joint ovality value; and
  carrying out external pressure collapse tests on a ring cut from one end of the received pipe joint, resulting in data representative of the hydrostatic collapse pressure of said pipe joint for use in confirming that the pipe joint is suitable for its intended use.

The inspection method of the first aspect checks that the hydrostatic collapse pressure of a pipe joint is sufficient for its intended use in a non-destructive way and verifies that the ovality of the pipe joint for installation in a pipeline is below a certain predetermined value. Confirming suitability for its intended use means, for example, suitability for its intended use at a certain water depth, temperature and/or hydrostatic pressure.

An assurance that ovality of the pipe joint for use in a subsea pipeline is below a predetermined maximum amount advantageously enables a less conservative safety factor and maximum pipe joint ovality to be used in the design of a pipe joint, with reduced risk of there being an unknown weak point caused by high ovality away from the pipe joint end(s) where the rings have been cut from. If, for example, the predetermined maximum ovality is to be 0.4% then a pipe joint may be designed based on a maximum ovality of 0.4%. Using a less conservative safety factor and maximum ovality value in this way leads to a pipe joint with reduced wall thickness but with improved assurance of safety. It has been found that a method in accordance with the first aspect may safely permit use of design guidance with a low safety factor chosen from the "high", "medium" or even the "low" safety class options.

The inspection method may advantageously be carried out on pipe joints which are to be installed and function in a subsea pipeline as opposed to testing a sample from a manufactured pipe which would then not be used in a pipeline, thereby providing a reliable, fast and cost-effective way of inspecting pipe joints, and is suitable for use with any type of pipe joint for use in a subsea pipeline such as light wall and heavy wall pipe joints.

The step in the inspection method of carrying out external pressure collapse tests may comprise carrying out external pressure collapse tests on a ring cut from one end, or on two rings, one cut from each end of the received pipe joint, or on two or more rings cut from cross-sections incrementally along the length of the received pipe joint.

The method is a notable departure from the conventional methods, which were established decades ago and continue to be used today and provides a considerable commercial advantage in designing, manufacturing and installing pipe joints for use in the pipelines.

Optional and preferred features of the method according to the first aspect will now be described.

Preferably, if the external pressure collapse tests confirm the pipe joint is suitable for its intended use and if the ovality does not exceed a predetermined maximum pipe joint ovality value, the method may include further steps of:
  receiving a further pipe joint for inspection;
  measuring the ovality of the further pipe joint to obtain ovality data;
  determining that the ovality data does not exceed a reduced predetermined maximum pipe joint ovality value which is reduced relative to the predetermined maximum pipe joint ovality value; and
  carrying out external pressure collapse tests on a ring cut from one or both ends of the received further pipe joint, resulting in data representative of the hydrostatic collapse pressure of said further pipe joint for use in confirming that the pipe joint is suitable for its intended use.

Inspecting a further pipe joint as set out above enables the predetermined maximum pipe joint ovality to be minimised for given manufacturing tolerances.

Preferably, the pipe joint received has an internal diameter and a wall thickness based on: required fluid flow through the pipeline; the hydrostatic pressure corresponding to a depth at which the pipe joint is to be used safely (i.e. a depth at which external pressure collapse will not occur); and, the predetermined maximum pipe joint ovality.

Preferably, the method further includes a step of applying or adding a safety factor to the depth at which the pipe joint is to be used in order to increase the minimum allowable hydrostatic pressure, and so the wall thickness of the pipe joint. Preferably, the safety factor is a coefficient (where the coefficient is applied to the depth at which the pipe joint is to be used, essentially adding a safety factor to the internal diameter and wall thickness determined). Preferably, the safety factor is from 1.0 to 1.2 and more preferably 1.1 to 1.2.

The external pressure collapse tests may be configured to apply external pressure on at least one ring cut from the received pipe joint to at least simulate the pressure at which the pipe joint is to be used in the subsea pipeline. Preferably, the external pressure collapse tests apply external pressure on at least one ring cut from the received pipe joint to determine at what pressure the ring fails. Preferably, the external pressure collapse tests are carried out on a statistically significant number of received pipe joints, such as 200 pipe joints in a pipeline i.e. every joint in a 2.5 km pipeline or every $100^{th}$ joint in a 250 km pipeline (assuming pipe joint length of 12.2 m).

Preferably, the external pressure tests comprise the steps of:
  cutting a ring from one end of the received pipe joint;
  forming flat substantially parallel surfaces on the ends of the ring;
  providing means for measuring strain and deformation of the ring;
  mounting the ring in a pressure chamber such that the ends of the ring form seals with opposing walls of the chamber to isolate the inside of the ring from the outside;
  increasing the pressure outside the ring and measuring the strain and deformation on the ring as the pressure increases; and,
  determining a comparison of pressure applied to the outside of the ring and maximum strain measured to detect the onset of accelerating non-linear reduction in ring diameter with increasing pressure.

The data from the hydrostatic collapse pressure tests may be compared to data representative of destructive collapse tests of sample pipe joints which have been subjected to destructive hydrostatic collapse tests. Comparing hydrostatic collapse pressure test data with destructive hydrostatic collapse test data may verify the accuracy of the obtained hydrostatic collapse pressure test data.

Preferably, the step of cutting a ring from one or both ends and carrying out external pressure collapse tests is performed before measuring ovality, after measuring ovality, or at the same time as measuring ovality.

Preferably, ovality for more than 10% along the length of the pipe joint is inspected, preferably more than 50%, and most preferably more than 90% of the pipe joint. Alternatively, ovality along the entire pipe joint length may be inspected (i.e. ovality of 100% of the pipe joint is inspected).

Preferably, the predetermined maximum ovality is less than or equal to 3%, preferably less than or equal to 1.2%, more preferably less than or equal to 0.5%, and most preferably less than 0.5%. For example, the maximum ovality may be 0.5%, 0.45%, 0.4%, 0.35%, 0.30%, 0.25%, 0.2%, 0.15%, 0.1%, 0.05%. The predetermined maximum ovality value may vary depending on manufacturing techniques and tolerances being used.

Preferably, measuring ovality comprises measuring out-of-roundness of the pipe joint to obtain out-of-roundness data, and using said out-of-roundness data to determine pipe joint ovality.

Preferably, out-of-roundness is determined by measuring the radii around the perimeter of the cross section at intervals of from 0.1° to 4°, preferably 0.2° to 3°, more preferably 0.3° to 2°, and most preferably in intervals of 0.3°.

Preferably, the pipe joint is measured by one or more lasers. The one or more lasers may be configured in an array of lasers and may be mounted in a rig.

Preferably, measuring the ovality of the pipe joint comprises a step of topographically mapping at least part of the pipe joint. Preferably, a topographical map of the pipe joint is obtained in terms of radii from the axis of the pipe joint.

Preferably, the ovality data is obtained from measurements taken internally or externally from the pipe joint.

Preferably, the pipe joint is received from a pipe joint manufacturing facility such as a pipe mill. Preferably, the ovality inspection is carried out whilst the pipe joint is being manufactured. Preferably, measuring the ovality of the pipe joint is carried out at the same speed as the pipe joint is being manufactured i.e. preferably the step of measuring ovality keeps pace with the pipe joint manufacturing pace. Alternatively, the pipe joint may be received from a storage of pipe joints which have been manufactured and are awaiting inspection before installation in a subsea pipeline.

Any delay to the process of inspecting a pipe joint for use in a subsea pipeline gives rise to a growing backlog of manufactured pipe joints in quarantine awaiting inspection. A problem with a backlog of quarantined manufactured pipe joints is that if any one of the quarantined backlog is found to be non-compliant in some way, the whole backlog has to be either scrapped or the manufacturing production line halted until they are all scanned, causing serous cost and delay. Receiving the pipe joint straight from a manufacturing facility and/or conducting the ovality inspection step whilst the pipe joint is being manufactured advantageously means that any problems are identified either whilst the pipe joint is being manufactured or shortly thereafter.

Preferably, the method further comprises a step of determining a new depth at which the pipe joint may be used safely if the pipe joint ovality is above the maximum pipe joint ovality.

Preferably, the pipe joint to be inspected is a coated or non-coated pipe joint. Pipe joints for use in subsea pipelines may comprise coatings (applied to the external surface thereof) such as concrete to give them added weight, or anti-corrosion coatings such as epoxy or polyethylene to minimise corrosion of the pipe joint. Non-coated pipe joints refer to pipe joints without any such coatings. If coatings are applied to the pipe joint then ovality data may be obtained based on internal measurements of the pipe joint based on uncoated surfaces.

Preferably, one or more of the steps are performed whilst the pipe joint is being manufactured e.g. the inspection method is carried out on a manufactured part of a pipe joint at the end a pipe mill.

In a second aspect of the invention there is provided a method of manufacturing a pipe joint for use in a subsea pipeline, the method comprising the steps of manufacturing a pipe joint and then carrying out the inspection method in accordance with the first aspect.

The preferred and optional features described above in connection with the first aspect of the invention may also be preferred and optional features in connection with the second aspect with equal effect.

LIST OF THE DRAWINGS

The above and other aspects of the invention will now be described, by way of example only, with reference to the accompanying drawings, in which.

SPECIFIC DESCRIPTION

Figure 1:
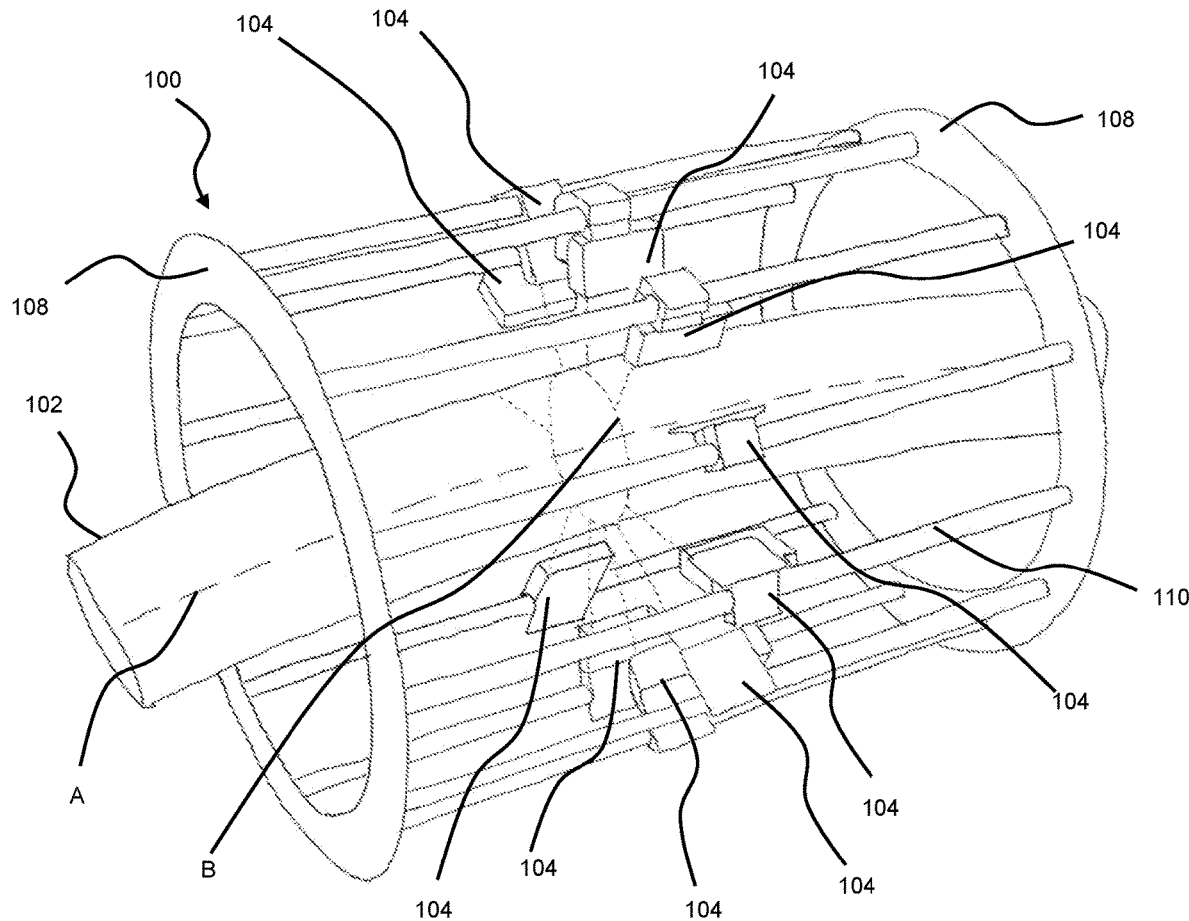
FIG. 1 shows an example of laser-based equipment rig for measuring out-of-roundness and ovality of a pipe.

When selecting a subsea pipeline system, all aspects relating to its design should be considered including, of course, the internal diameter and wall thickness of the pipe joints used in making the pipeline. The internal diameter of a pipe joint is calculated to make certain that the fluid flow through the pipeline will be sufficient to ensure the economic success of the pipeline during its operational lifetime. Once the internal diameter has been calculated, a target wall thickness of the pipe joint is then calculated according to the internal diameter and the hydrostatic pressure at the depth at which the pipeline is to be used so as to avoid, in so far as possible, external pressure collapse during installation of the pipeline.

The wall thickness can be calculated using standard industrial design guidance. An example of such guidance that is commonly used for such calculations is the DNGVL design code, in which the safety from the pressure collapse failure during pipeline installation is determined by the use of an approximate theoretical model of the pressure collapse process, together with several theoretically derived factors related to the pipe material properties and a general theoretically derived safety factor.

One theoretically derived factor considered when determining wall thickness is ovality i.e. a geometric property of the pipe joint. Ovality of a manufactured pipe joint may vary depending on the equipment used to form it or defects imparted on the pipe during the manufacturing process. Ideally, a pipe joint would be round with no extent of ovality (where ovality=0.0%), however, this is difficult to achieve in practice.

Once a pipe has been designed using the design guidance, a non-destructive technique may be used to test that the pipe joint meets the desired standard. An example of a non-destructive technique is ring testing, where one or more rings are cut from the manufactured pipe joint and collapse pressure tests are carried out on the one or more rings in order to verify that the actual collapse pressure corresponds to the designed collapse pressure. Accordingly, such non-destructive testing gives direct assurance, during their manufacture, of the collapse strength of the actual pipe joints (e.g. heavy-wall pipe joints) intended for installation in a pipeline. The method disclosed herein relates to a development to such non-destructive testing.

An example of a method in accordance with the invention will now be described.

A pipe joint to be inspected is fed into a laser measurement device (which hereafter may be referred to as "the device") which evaluates the geometry of the pipe using one or more lasers. The lasers may be configured to obtain pipe radius or diameter data at a plurality of cross sections along the length of a pipe joint, thereby topographically mapping said pipe joint.

The lasers may be configured to determine the radii in intervals around the perimeter of a cross section of the pipe (e.g. in 0.3 degree intervals) and to repeat this process at frequent intervals along the entire pipe length (i.e. 100% of the pipe joint), thereby mapping the pipe joint in a three-dimensional fashion.

The radii measurement intervals may not be restricted to 0.3 degrees and could be any interval in the range 0.1 to 10 degrees or 1, 5, 15, 20, 25, 30, 45, 90 degrees etc. For example, by taking radii measurements every 0.3 degrees around the perimeter of a cross section of a pipe, 1200 radius measurements (360/0.3) are taken by the device for each cross section along the length of the pipe joint.

The lasers may take radii measurements, for example, at 5 intervals along the length of the pipe joint, or equally the lasers may take radii measurements at 10, 100, 1000, 10000, 100000, 1000000, 10000000 cross section intervals along the entire length of the pipe joint. For example, radii measurements could be taken at 1000 intervals along the entire length of a 24.4 m (80 ft) pipe joint (i.e. 100% of the pipe) so a total of 1000 radius measurements would be taken.

Once inspected, the pipe joint passes through and is withdrawn from the device so that another pipe joint may be inspected. The inspection method is carried out at the same rate at which the pipe joints received are manufactured, so as to avoid the inspection method being a bottle neck in the pipe joint production and inspection process.

An example of a laser measurement device for use with the method disclosed herein (a rig of lasers) comprising several lasers and showing a pipe joint section therein is shown in FIG. 1 at item 100. A pipe joint is shown at item 102. A typical example of a pipe joint will be about 12.2 m long, have an external diameter of 508 mm and a wall thickness of 35 mm. Device 100 comprises two end ring pieces 108 which are held opposed and connected to one another by way of a plurality of connecting rods 110 therebetween. The end ring pieces 108 and connecting rods 110 (some of which are not labelled in FIG. 1) define a space for pipe joint 102 to pass through in such a way that positions the pipe joint 102 perpendicular to incident laser light beams from lasers 104. Connecting rods 110 support lasers 104.

The device 100 may be provided with any number of lasers. If one laser 104 is provided then the device 100 may, for example, be configured to rotate around the pipe joint 102 (around the axis shown by a dashed line at item A) to enable the laser to inspect the pipe joint (i.e. obtain radii measurements) as necessary. The provision of several lasers 104 facing a single cross section of the pipe joint 102 (such as the cross section at item B in dashed lines) avoids or reduces the extent to which the device 100 may need to rotate. Device 100 may be provided with rollers (not shown) to support and assist the pipe joint in passing therethrough. Rollers may also be configured within the device 100 so as to position the pipe joint 102 in a fixed place relative to the lasers 104.

The rig of lasers 100 may comprise any number of processors, sensors, motors etc. to take and determine measurement data with respect to out-of-roundness and ovality of a pipe joint passing therethrough. The rig of lasers may comprise a transmitter to transmit measurement data to external devices such as remote monitor and/or computer systems.

During inspection of a pipe joint, the device measures maximum and minimum radii (or diameters). The maximum and minimum radii (or diameters) determined by the device are used in determining out-of-roundness and pipe joint ovality using known design formula which can be found, for example, in the DNVGL design code. The pipe joint ovality data obtained through inspection is used to verify that, for all cross sections where ovality has been measured, the actual ovality of the pipe is below a maximum ovality specified when designing the pipe joint, and if it is then the pipe joint is deemed suitable for use at its planned operating depth. In other words, the ovality data obtained is checked to verify that at no point along the length of the pipe joint does the ovality exceed a maximum predefined ovality. For example, if the pipe joint is designed based on a maximum ovality of 0.5% then the inspection method must verify that the ovality of said joint does not exceed 0.5%. Similarly, if the pipe joint is designed based on a maximum ovality of 0.4% then the inspection method must verify that the ovality of said joint does not exceed 0.4%, and so on.

The effect of a pipe joint exceeding the specified maximum ovality value does not imply automatically rejecting the pipe for use in a subsea pipeline, since the pipe could be used at a shallower water level along the pipeline route. The suitable shallower operating depth can be determined using design formula based on the maximum ovality data found through the inspection.

Once ovality has been measured and a check has been carried out to confirm that ovality does not exceed the specified maximum ovality value, then hydrostatic collapse pressure of the pipe joint is determined to ensure the manufactured pipe joint is suitable for its intended use. One way of determining hydrostatic collapse pressure is by testing a ring specimen (hereinafter "the test ring") cut and machined from the received pipe joint.

The ring test uses a test method based on cutting rings from a pipe joint and machining the ring to a uniform length, and is described in more detail below. The pipe joint from which each test ring is cut can still be utilized as a production pipe joint and is therefore not wasted.

The ring test provides accurate data of the properties of the test ring, specifically the hydrostatic collapse pressure of the test ring, which can be extrapolated to correspond with the properties of the pipe joint from which the test ring was cut. Uniform properties such as ovality cannot be guaranteed along the entire pipe joint, and so analysis of the hydrostatic collapse pressure data from ring testing is combined with the ovality data obtained from the ovality measurements to check that the hydrostatic collapse pressure data can be considered to correspond with that of the pipe joint from which the test ring was cut.

A ring test method in accordance with the method disclosed herein will now be described.

A ring is cut and machined from a pipe joint. The test ring is placed in a rigid frame that allows the machined faces of the test ring to be sealed such that a pressure can be applied only to the outer circular surface of the test ring. The inner circular surface of the test ring is maintained at ambient pressure and thus is suitable for attachment of devices to measure the strains and deformations that are caused by the pressure on the outer circular surface of the test ring.

The seals on both machined flat faces of the test ring are such that during the pressure collapse test, deformation of the circular faces of the test ring is impeded. The seals on the flat faces of the ring are such that during testing the pressure is constrained to be on the outer circular surface of the test ring only and only on a small area of the flat machined faces. The seals are such that the test ring is not subject to substantial forces parallel to the machined flat faces such that the deformations of the circular faces of the test ring are impeded.

The pressure is applied from an external pump such that the pressure is increased or decreased by the addition or subtraction of a specified volume of fluid to or from the space surrounding the outer circular surface of the test ring. This arrangement allows the radial deformations of the test ring caused by the pressure on the outer cylindrical surface to increase or decrease in a controlled manner.

The action of the seals on the machined flat surfaces of the test ring can be achieved by encasing the test ring in a rigid block that is shaped to ensure that there is no deformation at the seals. An alternative arrangement is to have the space in which the seals operate adjustable and controlled by the action of a piston that is subjects to the same (or different) pressure as that applied to the outside cylindrical surface of the test ring.

A typical test will involve the following steps: i) cut the test ring from the pipe and machine the ends flat and parallel to within prescribed tolerances; ii) fit attachments to measure the strains and deformations of the test ring; iii) fit the test ring into the frame with the seals in place; vi) apply pressure and ensure the seals are active and effective; v) increase the pressure, recording the strain and deformation measurements; and, vi) continue to increase the pressure until a maximum value is attained; that is, until the occurrence of external pressure collapse.

It may be useful to also plot a curve of pressure applied against maximum strain measured to detect the onset of an accelerating nonlinear reduction in ring diameter with increasing pressure that is independent of any leakage of hydraulic fluid past the seals.

Figure 2:
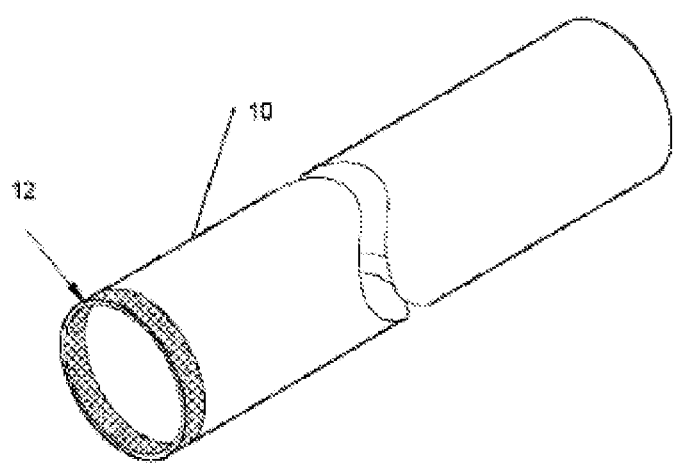
FIG. 2 shows a pipe joint of the type for inspection.
Figure 3:
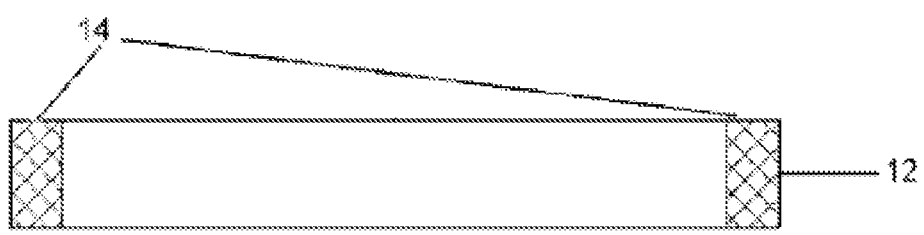
FIG. 3 shows a cross section of a test ring cut from the pipe joint shown in FIG. 2.

FIG. 2 shows a pipe joint 10 used in subsea pipelines. The test ring 12 (also shown in FIG. 3) is cut from one end of the pipe and has a length of 70 mm, approximately twice the wall thickness. Even after this length of test ring 12 has been cut, the pipe joint 10 can still be used in construction of a pipeline. The end surfaces 14 of the test ring 12 are machined so as to be substantially parallel and flat. By substantially parallel and flat, it is meant that there is a tolerance of ±0.01 mm on the overall length of the test ring 12.

Figure 4:
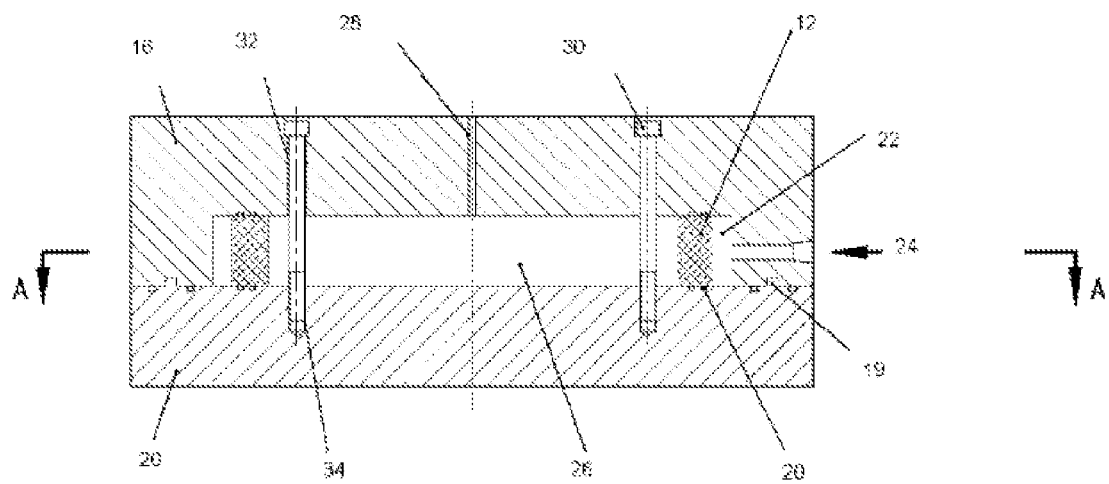
FIG. 4 shows a cross section of a test apparatus.
Figure 5:
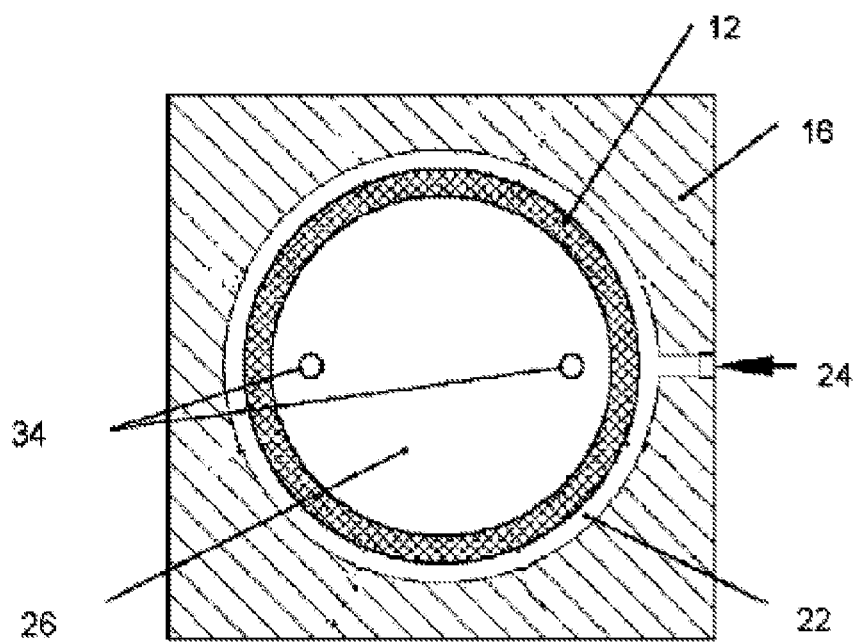
FIG. 5 shows a section on line A-A of FIG. 4.

FIG. 4 and FIG. 5 show one embodiment of a test apparatus for use in the test method, set up with a test ring 12 in place for testing. The test ring 12 is mounted between the top section 16 and lower section 18 which together define a pressure test chamber. The two sections of the pressure test chamber 16, 18 are provided with locating spigots 19, which locate in corresponding locating holes with associated seals 21 to allow location of the two halves. O-ring or pressure-energised pressure containing seals 20 are provided in the top and bottom sections. These are engaged by the test ring 12 to form an annulus accessible by a supply of pressurised hydraulic test fluid through an appropriate inlet port 24. The central void 26 inside the test ring 12 is vented to atmosphere through a bleed hole 28 which is of sufficiently large diameter to also provide access for any instrumentation cabling to the strain gauges (not shown) on the inner cylindrical surface of the test ring 12.

The two halves 16, 18 are held together by mechanical sealing screws 30. The screws 30 extend through holes 32 in the top section 16 and pass through the void 26 to engage in threaded bores 34 in the bottom section 18. Two screws 30 are shown but any suitable number can be used to ensure proper clamping.

The force with which the two sections 16, 18 are held together is sufficient to make the annulus 22 pressure tight internally and externally against the pressure containing seals 20, 21. The tolerance with which the test ring 12 is cut from the pipe is such that no leakage occurs from the annulus 22 into the void 26 whilst at the same time avoiding undue restraining friction on the radial movement inwards of the test ring 12 outer diameter under hydraulic loading.

Figure 6:
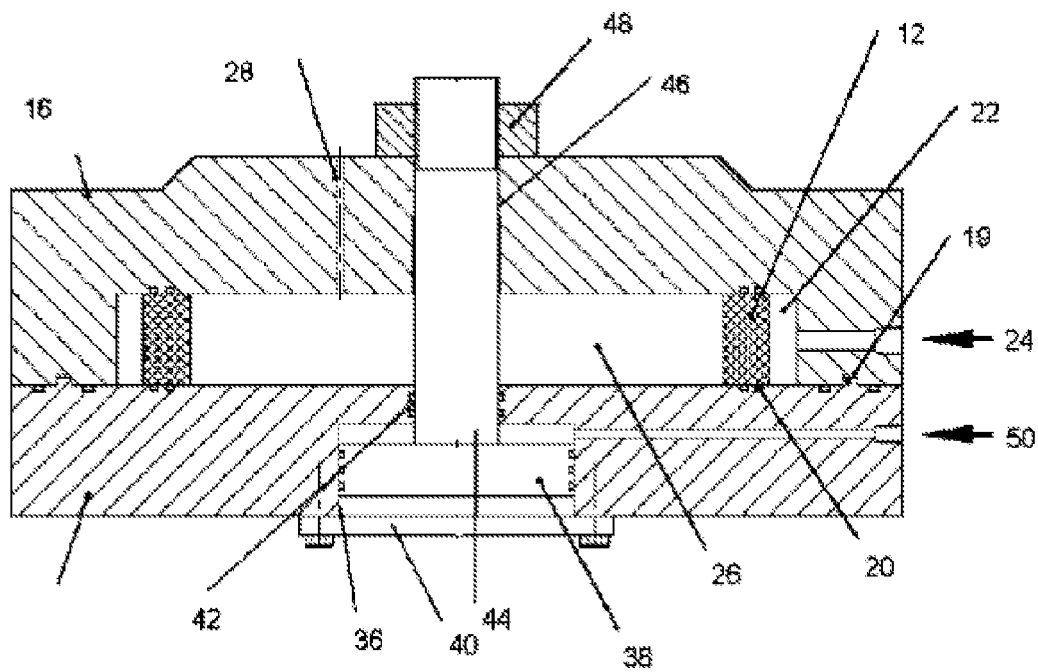
FIG. 6 shows a cross section of a second embodiment of the test apparatus.

FIG. 6 shows a second embodiment of the test apparatus in which the clamping screws shown in FIG. 4 and FIG. 5 are replaced by a hydraulic piston arrangement. A cylinder 36 is formed in the lower section 18 in which a piston 38 is slidably located. The outer end of the cylinder is closed by a plate 40. A bore 42 equipped with sliding seals extends from the inner end of the cylinder 36 to the void 26. A connecting rod 44 extends from the piston 38, through the bore 42 to a locating bore 46 in the top section 16 where it is fixed to a piston ring clamp 48. An inlet port 50 is provided at the lower end of the cylinder 36 to allow pressurised fluid to be admitted which drives the piston 38 along the cylinder 36 to clamp the top section 16 to the lower section 18.

Figure 7:
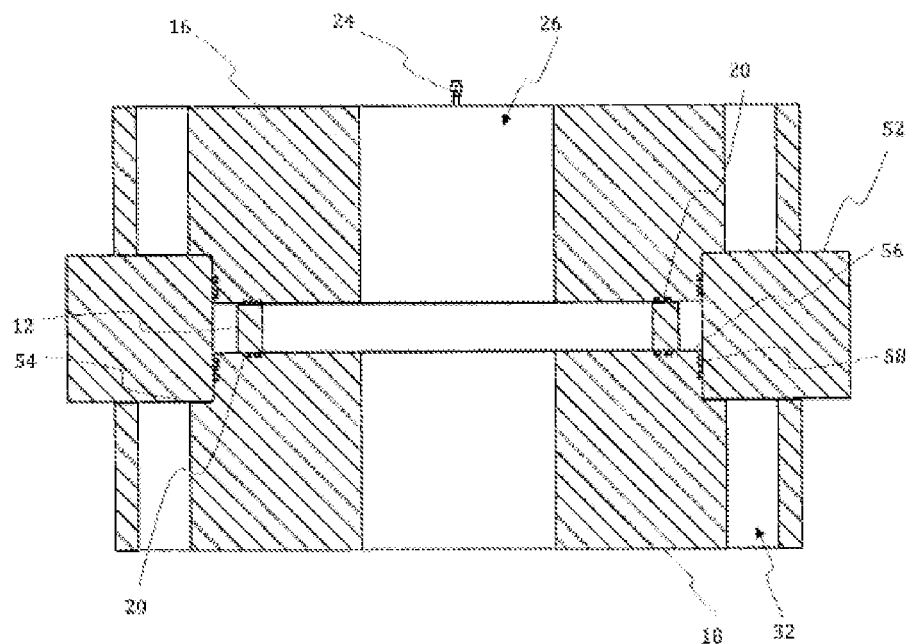
FIG. 7 shows a cross section of a third embodiment of the test apparatus.

FIG. 7 shows a further embodiment of the test apparatus for use in the test method set up with a test ring 12 in place for testing. The test ring is mounted between the a top cylindrical section 16 and bottom cylindrical section 18 with a spacer ring section 52 located therein between, which together define a pressure test chamber. The apparatus is provided with an inlet port 24 to supply pressurised fluid to the pressure chamber.

The top and bottom sections are in the form of a ring, having a central aperture 26. The central aperture provides access to the centre of the test equipment and the inner surface of the test ring, for the attachment of the sensors and other equipment for carrying out a pressure collapse test. The opposing surfaces of the top and bottom sections, are stepped forming a shoulder 54 extending circumferentially around the bottom and top edge of the top 16 and bottom 18 sections respectively. This provides a protruding annular stepped section 56 between the shoulder and the aperture of each section. The shoulder 54 of each section provides a support surface between which to locate the spacer ring 52. The annular stepped section 56 of each of the top and bottom sections provides a support surface on which to mount the test ring 12. The outer diameter of the annular stepped section corresponds substantially with the inner diameter of the spacer ring 52. The spacer ring 52 assists in adjusting the distance between the two faces of the top and bottom sections. The inner diameter of the spacer ring 52 is smaller than the outer diameter of the top 16 and bottom 18 sections, and larger than the diameter of their respective aperture. The outer diameter of the spacer ring 52 is larger than the outer diameter of the top 16 and bottom 18 sections.

Circumferential grooves for holding sealing means 20 are provided in the opposing faces of the top 16 and bottom 18 sections. Additional sealing means 58 are provided between the spacer ring 52 and the side surfaces of the annular stepped sections 56 of the top 16 and bottom 18 sections, in circumferential grooves in the side surface of the annular stepped section.

The top and bottom section sections are held together by mechanical sealing means, for examples screws (not shown), which extend through holes 32 around the outer edge of the top section 16 and spacer ring 20 to engage with holes 32 in the bottom section 18. Additional securing means can extend through the holes in the annular stepped section 56 of the top section and engage with holes in the annular stepped section 56 of the bottom section 18. Any number of securing means can be used to ensure proper clamping of the sections together.

In another preferred configuration particularly where the pipe diameter is larger without corresponding wall thickness increase the buckling deformation of the test ring in the rig may be sufficiently large for the ring to move out from under the O-ring seals permitting a sudden and undesirable loss of pressure from the annulus. In such cases, a modified rig configuration will be adopted where the sealing O-ring sits in grooves in the sample ring and slides between two annulus of highly polished plate surfaces.

It has been found that inspecting a pipeline using the present method and using current design guidance (such as the DNGVL design code) enables the design of a pipeline with improved safety assurances and which can be used in 30% deeper water for a given wall thickness, or with a 12% reduction in wall thickness for a given operating depth.

The methods according to the invention are notable departures from the conventional methods of designing and inspecting pipe joints that were established decades ago and continue to be used today. The methods provide a considerable commercial advantage in the availability of subsea pipelines, and in manufacturing and installing pipe joints for use in the pipelines. Those skilled in the art will appreciate that the presently disclosed methods teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and apparatuses, which, as a matter of language, might be said to fall there between.

The invention claimed is:

1. A method of inspecting a pipe joint for use in a subsea pipeline, the method comprising the steps of:
   receiving a pipe joint;
   measuring the ovality of the pipe joint to obtain ovality data;
   determining that the ovality data does not exceed a predetermined maximum pipe joint ovality value; and
   carrying out external pressure collapse tests on a ring cut from one end of the received pipe joint, resulting in data representative of the hydrostatic collapse pressure of said pipe joint for use in confirming that the pipe joint is suitable for its intended use, wherein the pipe joint received has an internal diameter and a wall thickness based on: required fluid flow through the pipeline; the hydrostatic pressure corresponding to a depth at which the pipe joint is to be used safely; and the predetermined maximum pipe joint ovality, and wherein the method further comprises a step of determining a new depth at which the pipe joint may be used safely if the pipe joint ovality is above the maximum pipe joint ovality.

2. The method according to claim 1, wherein further including a step of applying or adding a safety factor to the depth at which the pipe joint is to be used.

3. The method according to claim 2, wherein the safety factor is a coefficient.

4. The method according to claim 2, wherein the safety factor is from 1.0 to 1.2.

5. The method according to claim 1, wherein the external pressure tests further comprises the steps of:
   cutting a ring from one end of the received pipe joint;
   forming flat substantially parallel surfaces on the ends of the ring;
   providing means for measuring strain and deformation of the ring;
   mounting the ring in a pressure chamber such that the ends of the ring form seals with opposing walls of the chamber to isolate the inside of the ring from the outside;
   increasing the pressure outside the ring and measuring the strain and deformation on the ring as the pressure increases; and,
   determining a comparison of pressure applied to the outside of the ring and maximum strain measured to detect the onset of accelerating non-linear reduction in ring diameter with increasing pressure.

6. The method according to claim 5, wherein the step of cutting a ring from one end and carrying out external pressure collapse tests is performed before measuring ovality, after measuring ovality, or at the same time as measuring ovality.

7. The method according to claim 1, wherein ovality for more than 10% of the pipe joint is inspected.

8. The method of claim 7, wherein ovality for more than 50% of the pipe joint is inspected.

9. The method of claim 7, wherein ovality for more than 90% of the pipe joint is inspected.

10. The method according to claim 1, wherein ovality along the entire pipe joint length is inspected.

11. The method according to claim 1, wherein the predetermined maximum ovality is less than or equal to 0.5%.

12. The method according to claim 1, wherein measuring ovality comprises measuring out-of-roundness of the pipe joint to obtain out-of-roundness data, and using said out-of-roundness data to determine pipe joint ovality.

13. The method according to claim 12, wherein out-of-roundness is determined by measuring the radii around the perimeter of the cross section at intervals of from 0.1° to 4°.

14. The method according to claim 12, wherein out-of-roundness is determined by measuring the radii around the perimeter of the cross section at intervals of 0.3°.

15. The method according to claim 1, wherein ovality of the pipe joint is measured by one or more lasers.

16. The method according to claim 1, wherein measuring ovality of the pipe joint comprises a step of topographically mapping at least part of the pipe joint.

17. The method according to claim 1, wherein the ovality data is obtained from measurements taken internally or externally from the pipe joint.

18. The method according to claim 1, wherein the pipe joint is received from a pipe joint manufacturing facility.

19. The method according to claim 1, wherein the pipe joint to be inspected is a coated or non-coated pipe joint.

20. The method as claimed in claim 1, wherein any of the steps are performed whilst the pipe joint is being manufactured.

21. The method according to claim 1, wherein the pipe joint received is a heavy-wall pipe joint.

22. A method of manufacturing a pipe joint for use in a subsea pipeline, the method comprising the steps of:
   (a) manufacturing a pipe joint; and
   (b) inspecting the pipe joint using a method comprising the steps of:
      receiving a pipe joint;
      measuring the ovality of the pipe joint to obtain ovality data;
      determining that the ovality data does not exceed a predetermined maximum pipe joint ovality value; and
      carrying out external pressure collapse tests on a ring cut from one end of the received pipe joint, resulting in data representative of the hydrostatic collapse pressure of said pipe joint for use in confirming that the pipe joint is suitable for its intended use, wherein the pipe joint manufactured has an internal diameter and a wall thickness based on: required fluid flow through the pipeline; the hydrostatic pressure corresponding to a depth at which the pipe joint is to be used safely; and, the predetermined maximum pipe joint ovality, and wherein the method further comprises a step of determining a new depth at which the pipe joint may be used safely if the pipe joint ovality is above the maximum pipe joint ovality.

* * * * *